(12) United States Patent
Jang et al.

(10) Patent No.: US 7,345,165 B2
(45) Date of Patent: Mar. 18, 2008

(54) METHOD FOR PREPARING WATER-SOLUBLE FREE AMINE CHITOSAN

(75) Inventors: Mi Kyeong Jang, Changwon-si (KR); Chang Yong Choi, Yeosu-si (KR); Won Seok Kim, Yeosu-si (KR); Byeong Gi Kong, Yeosu-si (KR); Young Il Jeong, Kwangju-si (KR); Hyun Pil Yang, Pyungtaek-si (KR); Ji Tae Jang, Namyangju-si (KR)

(73) Assignee: Jae Woon Nah (KR)

( * ) Notice: Subject to any disclaimer, the term of this patent is extended or adjusted under 35 U.S.C. 154(b) by 654 days.

(21) Appl. No.: 10/489,379

(22) PCT Filed: Apr. 16, 2002

(86) PCT No.: PCT/KR02/00694

§ 371 (c)(1),
(2), (4) Date: Mar. 12, 2004

(87) PCT Pub. No.: WO03/035700

PCT Pub. Date: May 1, 2003

(65) Prior Publication Data
US 2004/0260077 A1 Dec. 23, 2004

(30) Foreign Application Priority Data

Sep. 25, 2001 (KR) ............................. 2001-59282
Nov. 12, 2001 (KR) ............................. 2001-70052

(51) Int. Cl.
C07H 5/04 (2006.01)
C07H 5/06 (2006.01)
C08B 37/08 (2006.01)

(52) U.S. Cl. ................. 536/55.3; 536/20; 536/55.2; 536/124

(58) Field of Classification Search ............... 536/20, 536/55.2, 55.3, 124
See application file for complete search history.

(56) References Cited

U.S. PATENT DOCUMENTS 4,528,283 A * 7/1985 Lang et al. ................ 514/55
4,574,150 A   3/1986 Austin (Continued)

FOREIGN PATENT DOCUMENTS

JP   06-220103   8/1994

OTHER PUBLICATIONS

Son, Yang Kook, et al., Method For Preparing Chitosan Derivatives, Application No. 10-1999-0077670, Application Date. Dec. 30, 1997, Abstract of KR 99-57607 A.

*Primary Examiner*—Shaojia Anna Jiang
*Assistant Examiner*—Everett White
(74) *Attorney, Agent, or Firm*—Lucas & Mercanti, LLP

(57) ABSTRACT

A method for the preparation of water-soluble chitosan with high purity and biological activity includes steps of: reacting chitosan oligo sugar acid salt, covalently bonded to an organic or inorganic acid, with trialkylamine in phosphate buffered saline followed by addition of an organic solvent to remove acid salt at C-2 position; adding the thus obtained reaction mixture to an inorganic acid to remove trialkylamine salt at C-6 position; and passing the thus obtained free amine chitosan through an activated carbon/ion exchange resin. The free amine chitosan is water-soluble and has a high bioavailability for application to the medicine and food industries.

16 Claims, 8 Drawing Sheets

U.S. PATENT DOCUMENTS 4,975,542 A    12/1990  Hirayama et al.
5,599,916 A     2/1997  Dutkiewicz et al.

5,708,152 A *   1/1998  Lohmann et al. ............. 536/20

* cited by examiner

METHOD FOR PREPARING WATER-SOLUBLE FREE AMINE CHITOSAN

This patent application claims the benefit of priority from Korean Patent Application Nos. 2001-59282 filed on Sep. 25, 2001 and 2001-70052 filed on Nov. 12, 2001 through PCT Application Serial No. PCTKR02/00694 filed on Apr. 16, 2002, the contents of each of which are incorporated herein by reference.

FIELD OF THE INVENTION

The present invention relates to a method for preparing water-soluble free amine chitosan with high purity.

BACKGROUND OF THE INVENTION

Chitosan is a highly insoluble N-acetylated polymer of beta-(1,4)-D-glucosamine with a pyranose unit and a biopolymer with a high molecular weight over 1 million Daltons bonded to a functional group of glucosamine over 5,000 units. Chitosan is a cellulose-like polymer present in fungal walls and the exoskeletons of arthropods, including insects, crabs, shrimps, and lobsters. Chitosan having a structural unit similar to cellulose can be applied in numerous fields of medical industry, due to its high bioavailability and a negative effect against immune response. Ever since the FDA (of the U.S.) recognized chitosan as a food additive, chitosan has been applied to biological engineering as an essential biomedical material.

For example, chitosan can be used in various industrial applications, including wastewater treatment (as a coagulant agent, heavy-metal absorbent, and waste-dye clarifier) and uses in the agricultural industry (as a soil-conditioner insecticide, plant antiviral agent, and agricultural chemical agent).

Lately, as the chitosan is known to have a molecular weight of 20,000~100,000 with a highly physical activity, the applications of chitosan were extended to include the practical fields of foods and beverages, health and sanitation, cosmetics, textiles, and medicines. The solubility and viscosity of chitosan are considered major problematic matters in such applications, since the chitosan is water-immiscible and grows viscous even when dissolved in water. Therefore, there is an urgent need to provide water-soluble chitosan free of the above problems.

Water-soluble chitosan has received considerable attention in this context since it can be applied to the aforementioned practical fields.

In the food industry, especially in health food, water-soluble chitosan shows various physical properties, including cholesterol reduction, enhanced immune response, improved liver function, absorption in the alimentary canal, and the control of blood sugar level and blood pressure. Additionally, chitosan's unique abilities, such as removal of skin-waste, excellent heat conservation, moisturization, antibacterial activity, and activation of cutaneous cells, have resulted in its employment as a primary component in the cosmetic industry, in such products as shampoo, hair rinse, hair spray, hair gel, creams, bathing agents, face packs, and face-washing agents. Moreover, the water-solubility of the chitosan is necessary for applications of products administered in a spray form, so that the chitosan can easily penetrate the wall of inner cutaneous cells and to prevent an increase in viscosity.

Additionally, the water-soluble chitosan is useful as a drug carrier such as an osteoporosis agent, an antirheumatism treating agent, and a heavy-metal removal agent, which can act in vivo, essentially with a high biological activity and water-solubility. As a drug carrier, the water-soluble chitosan is prepared in a variety of forms including tablets, capsules, pills, suspensions, solutions, and emulsions administered orally and parenterally.

Due to the presence of a strong hydrogen bond among adjacent atoms in chitosan, however, strong acid including organic acids (such as lactic acid, acetic acid, propionic acid, and tartaric acid) and inorganic acids (such as hydrochloric acid, nitric acid, and sulfuric acid) are required to dissolve the chitosan. Meanwhile, the toxicity of such strong acids raises still another problem to be applied in medical fields.

There are two different methods to prepare water-soluble chitosan: a chemical method and an enzymatic method.

In the chemical method, it is suggested that the water-soluble chitosan is prepared by hydrolysis using hydrochloric acid. This method, however, requires excessive amounts of HCl and an overly long period of time to hydrolyze the chitosan. As an another known chemical method, it is also suggested that the water-soluble chitosan is obtained by substitution of amine moiety at the C-2 position of chitosan with another moiety or by forming amine salt such as —$NH_3^+.CH_3CHOHCOO^-$, —$NH_3+.CH3COO—$, —$NH_3^+.Cl^-$, —$NH_3^+.CH_3CH_2COO^-$, —$NH_3^+.HCOO^-$, or —$NH_3^+$. .$HOOC(CHOH_2)COO^-$. This process has an advantage in that the water-soluble chitosan prepared does not further reduce molecular weight so that can be generally used in this art. The water-soluble chitosan obtained by this process, however, has a disadvantage in that it is difficult to dissolve in a gastro-instestinal tract of pH 1.2~1.5, because the aqueous solution containing chitosan salt shows pH 3.0 based on a 1.0% solution.

On the contrary, in the enzymatic method, the water-soluble is prepared by enzymatic treatment comprising steps of: dissolving chitosan in poor acid solution; hydrolyzing by enzymatic treatment about for 24 hours; and freeze-drying followed by packaging. Since the drying procedure is carried out without additional purification, the final product, which contains acid, can create problems when administered due to the acid's toxicity.

Hence, there is a need for method preparing water-soluble chitosan to solve the aforementioned problems, namely, for effective removal of leftover impurities and acid salt. As one attempt to realize such a method, Korea Patent No. 2000-15959 discloses a method for the removal of leftover salt and the unpleasant odor, comprising enzymolysis followed by forming an aqueous chitosan oligo sugar solution and passing the obtained solution through anionic exchange resin. The above disclosure, however, neither describes nor suggests properties of chitosan with high purity.

Therefore, the present invention contrives to realize water-soluble chitosan with high biological activity and high purity, one that is suitable for biomedical engineering applications.

SUMMARY OF THE INVENTION

It is an object of the present invention to provide a method for preparing water-soluble free amine chitosan.

It is another object of the present invention to provide water-soluble free amine chitosan with a high yield and purity.

It is yet another object of the present invention to provide water-soluble free amine chitosan having a high physiological activity.

Therefore, the present invention provides a method for preparing water-soluble free amine chitosan, comprising the steps of:
(a) reacting chitosan oligo sugar acid salt, covalently bonded to an organic or inorganic acid, with trialkylamine in phosphate buffered saline, followed by addition an organic solvent to remove acid salt at the C-2 position;
(b) adding the thus obtained reaction mixture to an inorganic acid to remove trialkylamine salt at the C-6 position; and
(c) passing the thus obtained chitosan with free-amine through an activated carbon/ion exchange resin.

The water-soluble free amine chitosan according to present invention has from 1,000 to 100,000 Daltons of molecular weight in various qualitative and quantitative analyses.

DETAILED DESCRIPTION OF THE INVENTION

Referring to FIG. 1, the water-soluble free amine chitosan (500) is prepared by: chitosan oligo sugar acid salt (100), as a starting material reacts with trialkylamine followed by adding organic solvent to remove acid salt at C-2 position (200); adding inorganic acid to remove trialkylamine at C-6 position (300); and purification (400).

In step (a) a reaction is carried out by chitosan oligo sugar acid salt reacting with trialkylamine in phosphate buffered saline. Then, the reaction mixture obtained dissolves in a suitable organic solvent, followed by post treatments carried out to remove acid salt.

In a preferred embodiment, as a starting material, the chitosan oligo sugar acid salt is prepared by dissolving chitosan in a suitable acid. This is followed by a known method of enzymolysis, whereby the obtained chitosan solution is treated by a known enzyme. The enzyme is originated from microorganism to convert chitosan oligo sugar and may include chitosanase oriented from *Bacillus pumilus, Bacillus subtilis*, or *Bacillus* sp. In the above process, chitosan oligo sugar acid salt exists as a complex of both amine at the C-2 position and —$CH_2OH$ at the C-6 position with acid salts.

Examples of a suitable acid include organic acid (such as lactic acid, acetic acid, propionic acid, formic acid, ascorbic acid and tartaric acid) and inorganic acid (such as hydrochloric acid, nitric acid, and sulfuric acid). When the lactic acid is used, the amine group at C-2 position of the chitosan oligo sugar acid is represented as —$NH_3^+$· $CH_3CHOHCOO^-$, and the others are as follows.

| Organic acid | Amine acid salt |
| --- | --- |
| acetic acid | —$NH_3^+$· $CH_3COO^-$ |
| propionic acid | —$NH_3^+$· $CH_3CH_2COO^-$ |
| formic acid | —$NH_3^+$· $HCOO^-$ |
| ascorbic acid | —$NH_3^+$· $CO(COH)_3CHOHCH_2O^-$ |
| tartaric acid | —$NH_3^+$· $HOOC(CHOH_2)COO^-$ |
| hydrochloric acid | —$NH_3^+$· $Cl^-$ |
| nitric acid | —$NH_3^+$· $NO_3^-$ |
| sulfuric acid | —$NH_3^+$·$HSO_4^-$ |

In step (a), the trialkylamine is used to remove an organic/inorganic acid bonded to amine group at C-2 position and to protect —$CH_2OH$ group at the C-6 position of chitosan oligo sugar acid salt.

Thus, the trialkylamine reacts with chitosan oligo acid salt, which exhibits strong acidity, and the amine group among trialkylamine interacts with $H^+$ of the amine group of chitosan oligo sugar acid salt, to be substituted with the alkali group of organic/inorganic acid, i.e., $CH_3CHOHCOO^-$, $CH_3COO^-$, and $Cl^-$. Therefore, free amine exists at C-2 position of chitosan oligo sugar, and at C-6 position, the —$CH_2OH$ group, which is protected by trialkylamine, remains.

Two to three parts (preferably two parts) trialkylamine, relative to one part of the amine group., is used at C-2 and C-6 positions of chitosan oligo sugar, to effectively remove organic/inorganic acid salt bonded to chitosan oligo sugar. A suitable trialkylamine includes $C_1$~$C_4$ trialkyl amine and is preferably trimetylamine, triethylamine, tripropylamine, triisopropylethylamine, or tributylamine; most preferable is triethylamine.

In a preferred embodiment, the reaction in step (a) is carried out in phosphate buffered saline of pH 6.8 to 7.4, preferably 6.8, 7.0, 7.2 or 7.4, at room temperature for approximately one to three hours, preferably two hours.

Then, in step (b) to remove acid salt at the C-6 position and an unreacted compound, the reaction mixture is dissolved in a suitable organic solvent. Examples of a suitable organic solvent include acetone; alcohols such as methanol, ethanol, and propanol; carbon chlorides such as chloroform and dichloromethane. A known post-treatment method such as air-drying or freeze-drying is subsequently carried out. Here, the air-drying or freeze-drying process is carried out at temperatures of 1-30° C. or below −54° C., respectively.

In step (b), an inorganic acid is added to the reaction mixture obtained in step (a), to remove the trialkylamine salt at the C-6 position and the unreacted triethylamine.

After trialkylamine salt at C-6 position of chitosan oligo sugar is removed, chitosan having a structure of free amine at the C-2 position and a —$CH_2OH$ group at the C-6 position can be obtained.

The employed inorganic acid is hydrochloric acid, nitric acid, or sulfuric acid in the range of 0.0005~0.6 N. Preferably, hydrochloric acid of 0.0010 N is used.

In a preferred embodiment, the reaction, in step (b), is carried out at room temperature for approximately one to two hours.

In step (c), the obtained chitosan is purified by passing through an activated carbon/ion exchange resin. Then, the aforementioned conventional drying process is performed on the resultant. Here, the ion exchange resin may be anionic exchange resin, cationic exchange resin, amphiphilic exchange resin, or non-ionic exchange resin.

Subsequently, a known post-treatment method such as air-drying or freeze-drying, preferably freeze-drying is subsequently carried out. Here, the air-drying or freeze-drying process is carried out at temperatures of 1-30° C. or below −54° C., respectively.

In other preferred embodiments, the obtained free amine chitosan was examined using FT-IR, $^1$H-NMR, and $^{13}$C-NMR techniques and was found to be water-soluble.

As shown in FIG. 2B, C=O peak (1730 $cm^{-1}$), originating from an organic acid such as lactic acid, acetic acid, propionic acid, or tartaric acid, disappeared with respect FIG. 2A. At the same time, amide I (C(=O)NH) and amine (—$NH_2$) peaks, clearly showing water-soluble chitosan, appear at 1635 $cm^{-1}$ and 1539 $cm^{-1}$, respectively. In addition, the impurity peak at 2100 $cm^{-1}$ was remarkably reduced.

In the $^1$H-NMR spectrum, it was found that peaks of approximately d 1.125-1.360 ppm originated from organic acid and that the impurity peaks disappeared (see FIGS. 3A and 3B), which is the same tendency as in the above FT-IR analysis. The $^1$H-NMR spectrum analysis also quantitatively confirmed the amount of hydrogen present in acetamide.

In the $^{13}$C-NMR spectrum, it was found that the peak (C=O) originated from organic acid and peaks of impurities were remarkably disappeared (see FIGS. 4A and 4B). The $^{13}$C-NMR spectrum analysis also quantitatively confirmed the amount of hydrogen present in acetamide and amide, respectively. From this spectrometric result, it was found that water-soluble free amine chitosan according to the present invention does not contain any organic/inorganic acid and is highly pure.

FIG. 5 shows that the difference of adjacent peak pairs is equal to the repeating unit of glucose amine of chitosan in mass analysis.

As shown in FIGS. 6~8, it was confirmed that the water-soluble chitosan of the present invention has a molecular weight of 1,000 to 100,000 and exhibits physiological activity.

As aforementioned, the water solubility of the chitosan according to the method of the present invention can be effectively improved since it has free amine with a highly positive charge in chitosan as compared with that prepared by prior art such as salt formation. In addition, as the chitosan of the present invention has molecular weight with a physiological activity, it can be preferably applied to medical application. For instance, the chitosan of the present is covalently bonded to a gene or DNA with a negative charge, such that it can be easily used as a gene carrier capable of treating diseases based on a gene defect or incurable diseases. Further, the application for biological engineering for use as a biomedical material of the next-generation is also expected.

BRIEF DESCRIPTION OF THE DRAWINGS

The accompanying drawings, which provide a further understanding of the invention and are incorporated, and constitute a part of this application, illustrate embodiments of the invention and together with the description serve to explain the principle of the invention. In the drawings.

The invention will be more fully understood by the following examples, which are not to be considered as limiting the scope of the invention.

EXAMPLE 1

Preparation of Water-soluble Free Amine Chitosan

Pre-Step: Preparation of Chitosan Oligo Sugar

Five units of chitosanase originated *Bacillus pumilus* BN-262 was added to 100 ml of 5% chitosan solution (pH 5.0~5.5) dissolved in lactic acid and reacted at 40° C. for 36 hours. After completion of the reaction, the reaction mixture was pre-filtered by 1 μm filter paper and subsequently filtered using a hollow filter (MW 20,000) ["MW" is the abbreviation for molecular weight]. The thus obtained filtrate was concentrated by means of a nano-filter system, sterilized, and then air dried to produce a powdered chitosan oligo sugar protected with lactic acid at the C-2 and C-6 positions.

Step (a): Preparation of Chitosan Oligo Sugar Acid Salt Protected with Lactic Acid at C-2 Position The chitosan oligo sugar in one liter of phosphate buffered saline (pH 7.0) was slowly dropped in 0.52 liter of triethylamine. The reaction was carried out at room temperature for two hours, using two parts of triethylamine and one part amine of chitosan oligo sugar. Acetone was added to the thus obtained reaction mixture while stirring, and the resultant was then centrifuged at 15,000 rpm (using a Supra 30 K) at 4° C. for twenty minutes. After the procedure was repeated three times, air-drying was carried out at room temperature followed by freeze-drying at a temperature below −54° C., thereby preparing chitosan oligo sugar acid salt having lactic acid at the C-2 position and —CH$_2$OH group at the C-6 position.

Step (b): Preparation of Free Amine Chitosan at C-2 Position 50 ml of 0.0010 N hydrochloric acid was added to the chitosan oligo sugar salt obtained in step (a), and the resultant was reacted for two hours. Acetone was added to the thus obtained reaction mixture while stirring and then the above-described centrifuging was performed. After the procedure was repeated three times, air-drying was carried out at room temperature followed by freeze-drying at a temperature below −54° C.

Step (c): Purification

The dried product, prepared as in the step (b), was dissolved in double-distilled water, which was passed through an ion exchange column with activated carbon and then dried, to yield white free amine chitosan.

FT-IR Spectrum Analysis

To compare the chitosan prepared according to the method of the present invention with chitosan oligo sugar having organic/inorganic acid, FT-IR analysis was carried out as follows.

Three milligrams of free amine chitosan and chitosan oligo sugar, prepared as in Example 1, was combined with 300 mg of potassium bromide, ground on an agate mortar and pestle for ten minutes, and molded into pellet. Each pellet was determined by means of FT-IR analysis (using an 8700 manufactured by Shimadzu) at 60° C. under reduced pressure.

Figure 1:
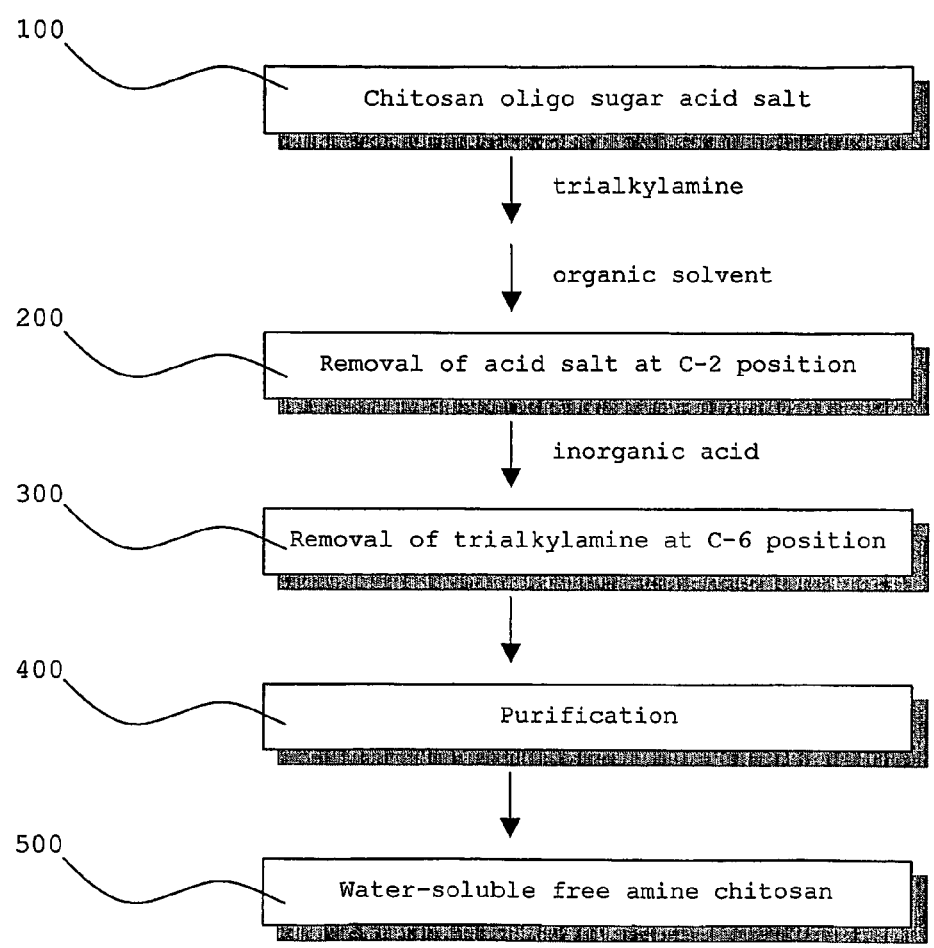
FIG. 1 is a flow chart showing a method for preparing water-soluble free amine chitosan according to the present invention.
Figure 2A:
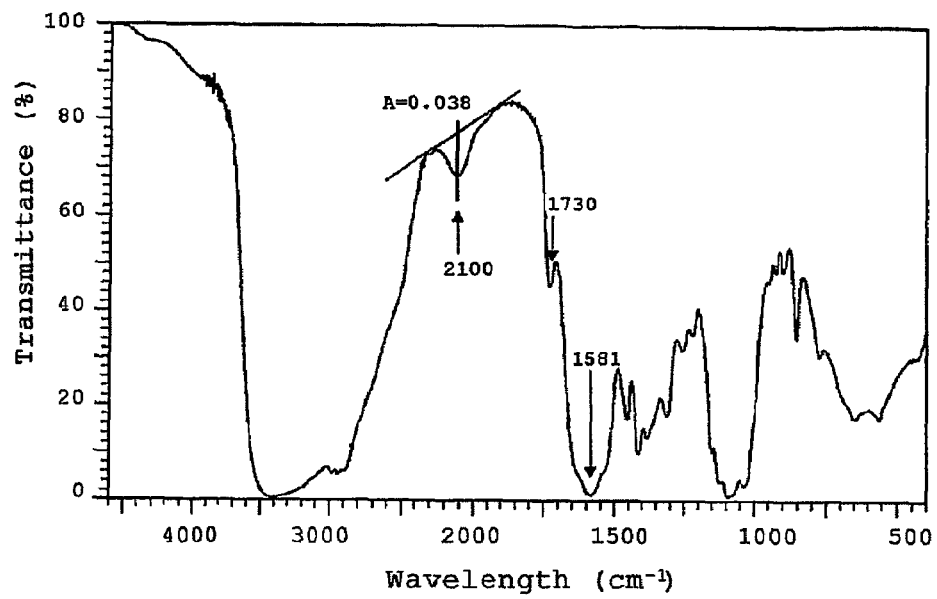
FIG. 2A is a graph showing an FT-IR spectrum analysis of chitosan oligo sugar acid salt.
Figure 2B:
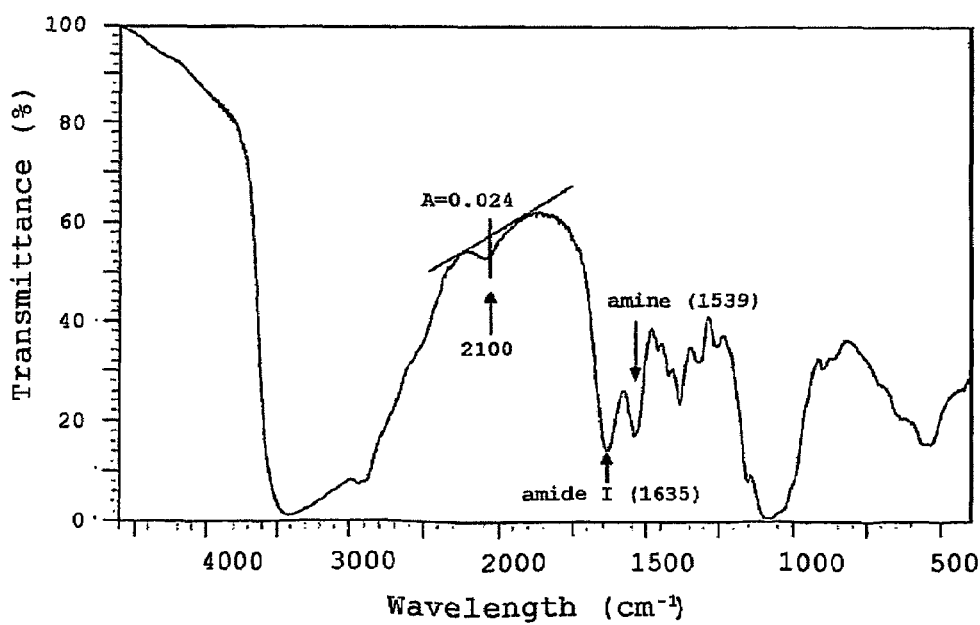
FIG. 2B is a graph showing an FT-IR spectrum analysis of free amine chitosan removed acid salt.

FIGS. 2A and 2B respectively show the FT-IR spectra of chitosan oligo sugar acid salt protected with lactic acid at the C-2 and C-6 positions, prepared per step 1 of Example 1, and free amine chitosan prepared per step 3 of Example 1.

As shown in FIG. 2A, it was found that the carboxyl group of lactic acid and impurities produced in enzymolysis peak at about 1730 cm$^{-1}$ and 2100 cm$^{-1}$ (A=0.038), respectively.

On the contrary, as shown in FIG. 2B, the C=O peak (1730 cm$^{-1}$) of lactic acid almost disappeared and the impurity peaks (2100 cm$^{-1}$, A=0.024) were remarkably reduced, as compared with that of FIG. 2A. In addition, due to hydrogen bond weakened, the amide I (—C=O) and amine (—NH$_2$) peak appear sharply at about 1635 cm$^{-1}$ and 1539 cm$^{-1}$, respectively. These results provide evidence that, according to the method of the present invention, the free amine chitosan does not contain any lactic acid of organic acid, thanks to the complete removal of acid-salt bonded to —CH$_2$OH and amine at the C-6 position.

$^1$H-NMR Spectrum Analysis

To compare the free amine chitosan prepared according to the method of the present invention with chitosan oligo sugar, $^1$H-NMR analysis was carried out as follows.

Ten milligrams of chitosan oligo sugar (0.54 mmol), prepared per step 1 of Example 1, was dissolved in D$_2$O and then measured by $^1$H-NMR spectrometric analyzer (using a DRX-500 manufactured by Bruker). In the same manner, the free amine chitosan prepared per step 3 of Example 1 is also detected.

Figure 3A:
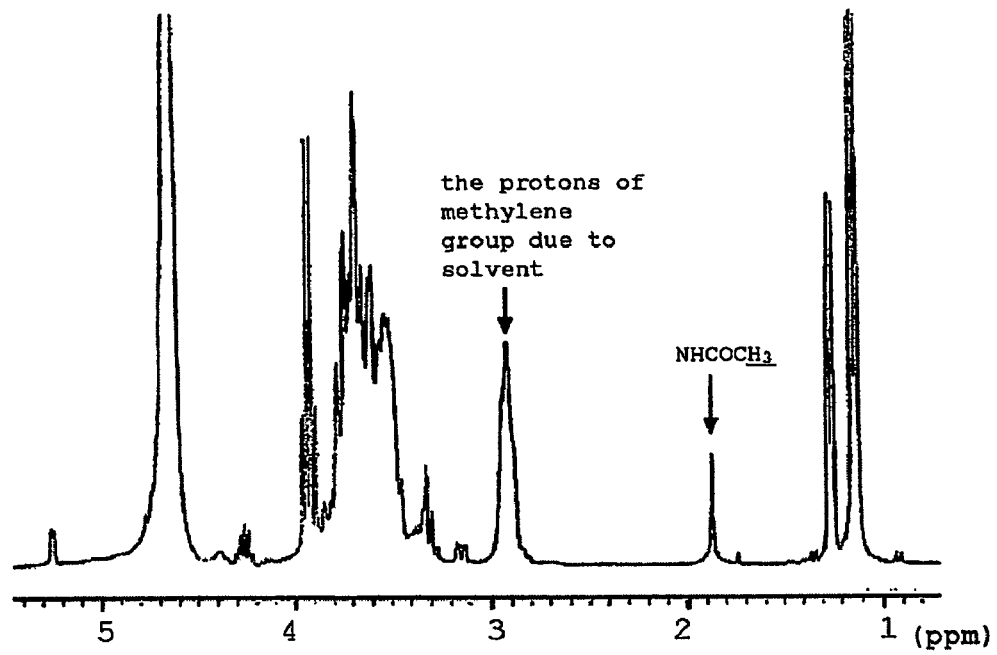
FIG. 3A is a graph showing a $^1$H-NMR spectrum analysis of chitosan oligo sugar with acid salt.
Figure 3B:
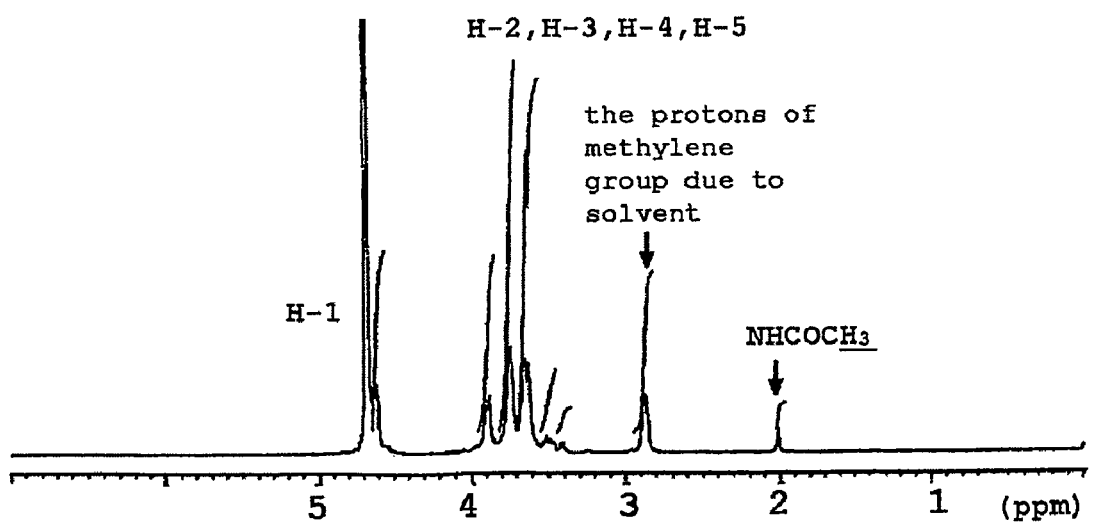
FIG. 3B is a graph showing a $^1$H-NMR spectrum analysis of chitosan oligo sugar removed acid salt.

FIGS. 3A and 3B respectively show the $^1$H-NMR spectra of chitosan oligo sugar with and without acid salt.

In FIG. 3A, it can be seen that lactic acid peaks appear strongly at approximately d 1.125~1.360 ppm while the other peaks are impossible to define due to impurities.

FIG. 3B, however, shows that the lactic acid peaks disappeared and peaks of impurities were remarkably reduced. It was quantitatively confirmed that one proton at C-1 position (H-1) was appeared at 4.730, 4.684 and 4.623 ppm by triplet. Due to oxygen atom with high electronegativity in glucosamine unit, the resornance of the proton at C-1 position neared by oxygen atom brings out at downfield, therefore, the peak of said proton splits by triplet at 4.730~4.623 ppm while the proton of cycloalkane appears at 0~2 ppm as usual. Three protons of methyl group bonded to carbonyl also slightly peaked about at 2.020 ppm by singlet. This peak intensity provides evidence that acetamide group originated from chitin unit of a raw material is quantitatively present. In addition, six protons at C-2, C-3, C-4, C-5 and C-6 positions (H-2, H-3, H-4, and H-5) were also appeared about at 3.411~3.909 ppm. Concretely, due to hydrogen bond weakened, the H-2 peak at C-2 position was divided d 3.910 ppm into 3.888 ppm. Also, it was quantitatively found that each H-3, H-4, H-5 and H-6 was split by singlet or doublet.

Further, in FIGS. 3A and 3B, the peak showing at 2.875 ppm appears the protons of methylene group due to NMR solvent is negligible.

$^{13}$C-NMR Spectrum Analysis

To compare the free amine chitosan according to the present invention with chitosan oligo sugar, $^{13}$C-NMR analysis was carried out as follows.

Ten milligrams of chitosan oligo sugar (0.54 mmol), prepared per step 1 of Example 1, was dissolved in D$_2$O and then measured by means of $^{13}$C-NMR spectrometric analysis (using a DRX-500 manufactured by Bruker). In the same manner, the free amine chitosan prepared per step 3 of Example 1 is also detected.

Figure 4A:
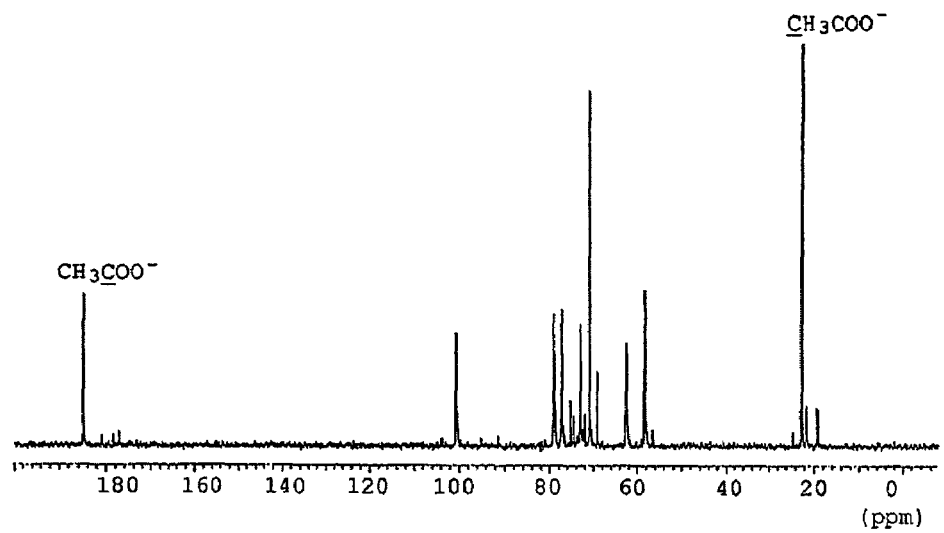
FIG. 4A is a graph showing a $^{13}$C-NMR spectrum analysis of chitosan oligo sugar with acid salt.
Figure 4B:
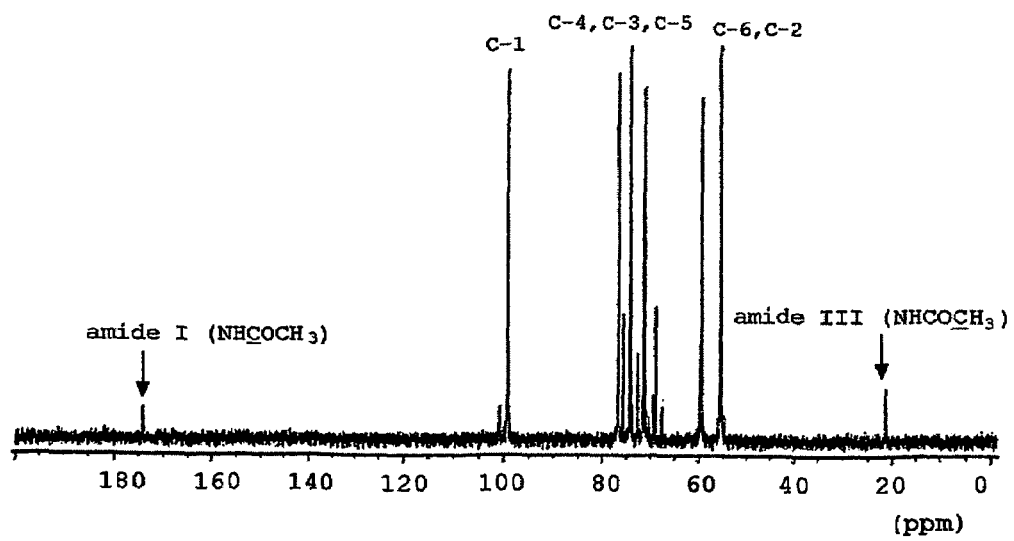
FIG. 4B is a graph showing a $^{13}$C-NMR spectrum analysis of free amine chitosan of the invention.

FIGS. 4A and 4B respectively show the $^{13}$C-NMR spectra of chitosan oligo sugar with and without acid salt.

As shown in FIG. 4A, there is a peak of lactic acid strikingly apparent about at 20 ppm, while the other peaks are impossible to define due to impurities.

FIG. 4B, however, quantitatively shows carbon atoms of free amine chitosan prepared by the method of the present invention (per step 3 of Example 1) and the remaining chitin unit as a raw material. It is quantitatively that peaks of carbon atoms (C-1, C-2, C-3, C-4, C-5 and C-6 positions) of free amine chitosan were appeared about at 55.298~100.699 ppm. Due to oxygen atom with high electro-negativity in glucosamine unit, the resornance of the carbon at C-1 position neared by oxygen atom brings out at downfield, therefore, the peak of said carbon appears at 99.149 ppm while the carbon having sp$^3$ appears at 8~60 ppm as usual. The impurity peaks were remarkably reduced, as compared with that of FIG. 4A. Additionally, it is qualitatively found that the peak of amide I and amide III bonded to carbonyl group, in which originated from acetamide of chitin unit, appear at 21.520 ppm and 173.995 ppm, respectively.

This result provides evidence that chitin unit in 7% of residue is present when 93% degree of deacetylation and 18,579 Daltons of the free amine chitosan are fully considered.

From these results, it can be seen that water-soluble free amine chitosan according to the present invention does not include any organic/inorganic acid and is highly pure.

Mass Analysis

To determine the mass of glucosamine, repeating unit of free amine chitosan according to the present invention, mass spectrometer analysis was carried out using a mass spectrometer (MALDI-TOF of Shimadzu, Japan).

Figure 5:
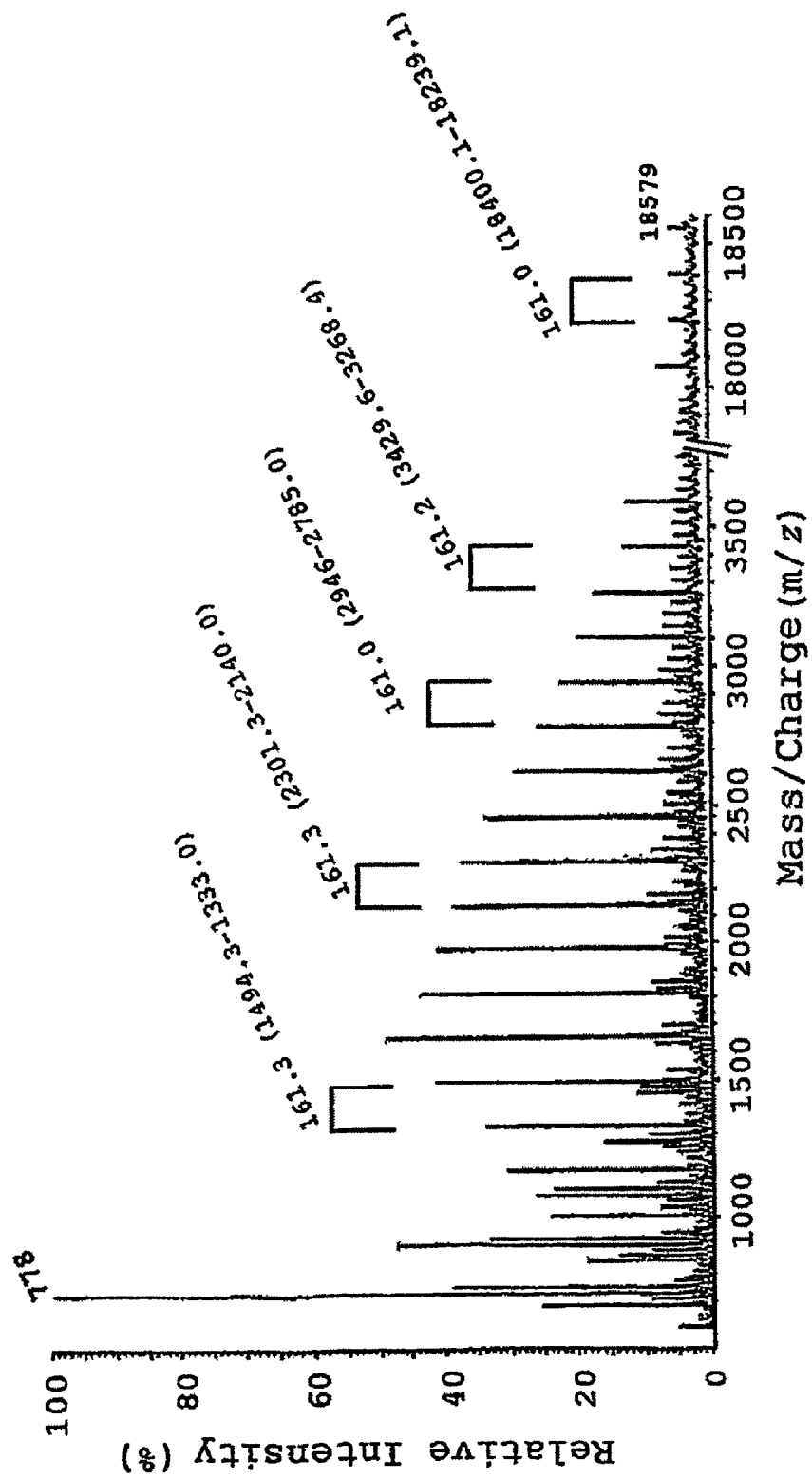
FIG. 5 is a graph showing a mass spectrum analysis of free amine chitosan of the invention.
Figure 6:
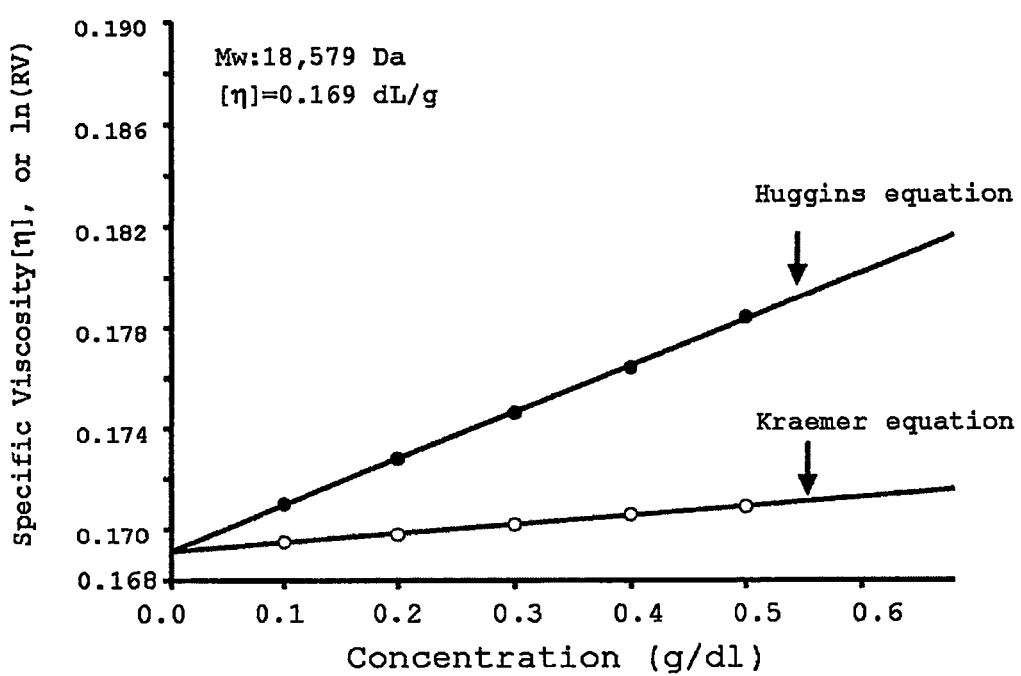
FIGS. 6 to 8 are graphs illustrating a molecular weight of free amine chitosan of the invention according to Huggins' equation and Kraemer's equation.

As shown in FIG. 5, it is found that the molecular weight of free amine chitosan prepared per step 3 in Example 1 is 18,579 Daltons and the difference between adjacent peak pairs is average 161. The value is equal to that the molecular weight of glucosamine unit of chitosan.

Molecular Weight Analysis

To determine the molecular weight of the free amine chitosan prepared according to method of the present invention, specific viscosity in accordance with concentration was measured using relative viscometer (Vsicotek, Y 501C, USA).

Introducing the value measured Huggins' equation and Kraemer's equation as known in this art, the molecular weight of free amine chitosan prepared per step 3 in Example 1 was confirmed 18,579 Daltons.

EXAMPLE 2

Preparation of Water-soluble Free Amine Chitosan

The water-soluble free amine chitosan was prepared in the same manner as described in Example 1, except that the low molecular weight chitosan oligo sugar as a starting material was used.

To determine the obtained free amine chitosan, the analyses including $^1$H-NMR, $^{13}$C-NMR, mass analysis and molecular weight were carried out in the manner as described in Example 1.

Figure 7:
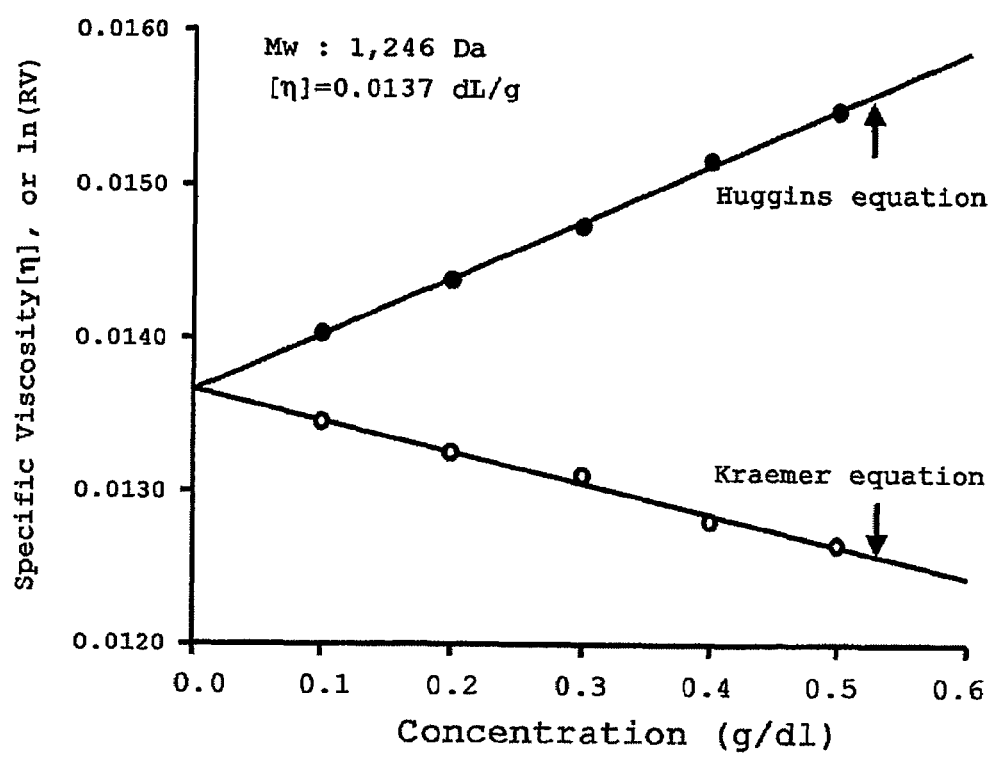

In spectrometric analyses including $^1$H NMR and $^{13}$C NMR, similar patterns were confirmed. In addition, it is found that the free amine chitosan of Example 2 has 1,246 Daltons (see the FIG. 7).

EXAMPLE 3

Preparation of Water-soluble Free Amine Chitosan

The water-soluble free amine chitosan was prepared in the same manner as described in Example 1, except that the low molecular weight chitosan oligo sugar as a starting material was used.

To determine the obtained free amine chitosan, the analyses including $^1$H NMR, $^{13}$C NMR, mass analysis and molecular weight were carried out in the manner as described in Example 1.

Figure 8:
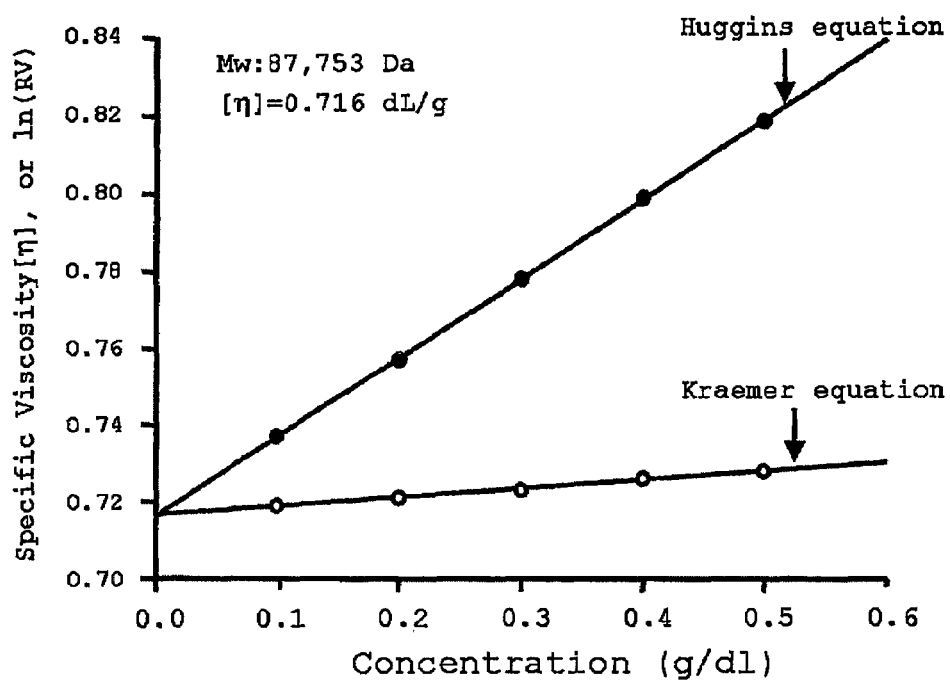

In spectrometric analyses including $^1$H NMR and $^{13}$C NMR, similar patterns were confirmed. In addition, it is found that the free amine chitosan of Example 3 has 87,753 Daltons (see the FIG. 8).

As described hereinbefore, the water-soluble free amine chitosan according to the present invention is prepared by reacting chitosan oligo sugar acid salt with trialkylamine; adding the thus obtained reaction mixture to inorganic acid to remove acid salt at the C-2 position; and passing the thus obtained chitosan through activated carbon/ion exchange resin. Also, the water-soluble free amine chitosan according to present invention was found to have a molecular weight of 1,000~100,000 Daltons and to exhibit biological activity and high purity. Exerting a positive charge of free amine of chitosan, the free amine chitosan according to the present invention can therefore be used as a gene carrier for DNA with a negative charge, for treatment of disease due to gene defects in the medical industry, and as a primary component in the functional food industry.

The forgoing embodiments are merely exemplary and are not to be construed as limiting the scope of the present invention. The present teachings can be readily applied to other types of methods. The description of the present invention is intended to be illustrative, and not to limit the scope of the claims. Many alternatives, modifications, and variations will be apparent to those skilled in the art.

What is claimed is:

1. A method for preparing water-soluble chitosan having free amine groups, comprising the steps of:
   (a) enzymatically hydrolyzing an organic or inorganic acid salt of chitosan oligo sugar;
   (b) reacting the hydrolysis product of step (a) with trialkylamine;
   (c) adding an organic solvent to the product of step (b) to remove the acid salt at C-2 position of the chitosan oligo sugar;
   (d) adding an inorganic acid to the product of step (c) to remove trialkylamine salt at C-6 position of the chitosan oligo sugar; and
   (e) purifying a chitosan having free amine groups from the products of step (d).

2. The method according to claim 1, wherein the molecular weight of the water-soluble chitosan ranges from 1,000 to 100,000 Da.

3. The method according to claim 1, wherein the organic acid of said step (a) is selected from the group consisting of lactic acid, acetic acid, propionic acid, formic acid, ascorbic acid and tartaric acid.

4. The method according to claim 1, wherein the inorganic acid of said step (a) is selected from the group consisting of hydrochloric acid, nitric acid, and sulfuric acid.

5. The method according to claim 1, wherein the trialkylamine is selected from the group consisting of trimethylamine, triethylamine, tripropylamine, triisopropylethylamine, and tributylamine.

6. The method according to claim 1, wherein the trialkylamine is trimethylamine.

7. The method according to claim 1, wherein the trialkylamine is used in an amount of two to three parts relative to one part of the amine group of chitosan oligo sugar acid salt.

8. The method according to claim 1, wherein said step (b) occurs in phosphate buffered saline solution in a range of from pH 6.8 to pH 7.4.

9. The method according to claim 1, wherein the organic solvent is selected from the group consisting of acetone; alcohols selected from the group consisting of methanol, ethanol, and propanol; and carbon chlorides selected from the group consisting of chloroform and dichloromethane.

10. The method according to claim 1, wherein the inorganic acid of said step (d) is selected from the group consisting of hydrochloric acid, nitric acid, and sulfuric acid.

11. The method according to claim 1, wherein the inorganic acid of said step (d) is hydrochloric acid.

12. The method according to claim 1, wherein the concentration of the inorganic acid of said step (d) ranges from 0.0005 to 0.600 N.

13. The method according to claim 1, wherein the organic or inorganic acid salt of chitosan oligo sugar is prepared by dissolving chitosan oligo sugar in an organic acid or inorganic acid.

14. The method according to claim 1, wherein the organic or inorganic acid salt of chitosan oligo sugar is treated with chitosanase.

15. The method according to claim 1, wherein the organic or inorganic acid salt of chitosan oligo sugar is dissolved in phosphate buffered saline solution.

16. The method according to claim 1, wherein step (e) includes passing the product of step (d) through an activated carbon/ion exchange to recover a chitosan having free amine groups.

* * * * *